United States Patent

Janiak

[15] 3,673,237
[45] June 27, 1972

[54] 2,4-DINITRO-6-ALKYL PHENYL-CYCLOPROPIONATES

[72] Inventor: Stefan Janiak, Basel, Switzerland
[73] Assignee: Ciba Limited, Basel, Switzerland
[22] Filed: March 10, 1969
[21] Appl. No.: 805,849

[30] Foreign Application Priority Data
March 14, 1968 Switzerland ..........................3767/68

[52] U.S. Cl..............................260/468 P, 71/100, 71/106, 260/340.9, 260/458 R, 260/465 D, 260/468 R, 260/470, 260/473 S, 424/301, 424/305
[51] Int. Cl.........................................................C07c 69/74
[58] Field of Search ..............................260/468 A

[56] References Cited

UNITED STATES PATENTS 3,509,180  4/1970  Elliot.....................................260/468

FOREIGN PATENTS OR APPLICATIONS 935,398  8/1963  Great Britain..........................260/479

OTHER PUBLICATIONS

Kirby et al., Nitro Compounds, p. 483 & 507, 1963.

Primary Examiner—Lorraine A. Weinberger
Assistant Examiner—Robert Gerstl
Attorney—Harry Goldsmith, Joseph G. Kolodny, Bryant W. Brennan and Edward J. Sites

[57] ABSTRACT

It has been found that cycloalkyl carboxylic acid esters of the general formula

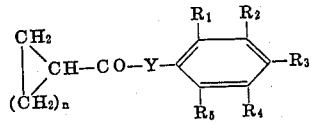

wherein $n$ denotes one of the numbers 1, 2 or 3, Y represents oxygen or sulphur and $R_1$, $R_2$, $R_3$, $R_4$ and $R_5$ each represents hydrogen or various substituents possess biocidal activity, preferably for combatting weeds, members of the class Arachnoidea and bacteria and fungi.

7 Claims, No Drawings

2,4-DINITRO-6-ALKYL PHENYL-CYCLOPROPIONATES

The present invention relates to new cycloalkane esters and their manufacture, as well as to pesticides which contain these esters as active substances.

The new substances comprise compounds of the type

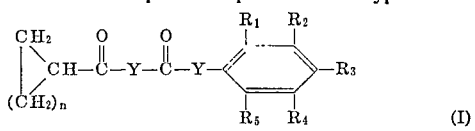

(I)

wherein $n$ denotes one of the numbers 1, 2 or 3, $R_1$, $R_2$, $R_3$, $R_4$ and $R_5$ are identical or different and denote hydrogen, halogen atoms, alkyl, aralkyl, alkenyl, alkoxy, aralkoxy, alkylthio, phenyl, formyl, carbalkoxy, nitro, amino, monoalkylamino, dialkylamino, nitrile and/or trifluoromethyl groups, and Y is oxygen or sulphur.

In a narrower sense, compounds of formula (I) to be understood thereby are those wherein $n$ denotes one of the numbers 1, 2 or 3, $R_1$, $R_2$, $R_3$, $R_4$ and $R_5$ are identical or different and denote hydrogen, halogen atoms, alkyl, alkoxy, alkylthio, formyl, carbalkoxy, nitro, amino, monoalkylamino, dialkylamino, nitrile and/or trifluoromethyl groups, and Y is oxygen or sulphur. Those compounds in which Y is oxygen are preferred.

The new substances are used as active ingredients in pesticides, together with one or more of the following additives: solvents, diluents, dispersing agents, wetting agents, adhesives, binders, thickeners, carriers or other pesticides.

These materials can on the one hand be employed against insects, representatives of the class *Arachnoidea* (ticks, mites and spider mites), nematodes, micro-organisms, especially phytopathogenic bacteria and fungi, gastropodes, water pests such as algae, or sedentaria, and on the other hand represent selective herbicides which show favorable results, particularly on post-emergence application, against harmful monocotyledons and dicotyledons in the culture of useful plants.

The new cycloalkanecarboxylic acid esters of formula (I) can be manufactured in a simple manner by reaction of a cycloalkanecarboxylic acid of formula

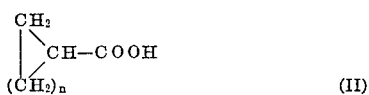

(II)

or of a reactive functional derivative of such an acid with a phenol of formula

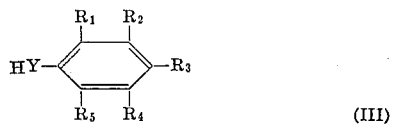

(III)

wherein $R_1$, $R_2$, $R_3$, $R_4$, $R_5$, Y and n have the significance mentioned.

As reactive functional derivatives of an acid of formula (II) it is possible to use: the halides, anhydrides, mixed anhydrides and esters, especially the lower alkyl esters.

Preferably, the halides of the acids of formula (II) are used, with the process then being carried out in the presence of a hydrogen halide acceptor, for example a tertiary base.

It is however also possible to react an alkali phenolate with a corresponding acid halide.

The new esters of formula (I) are in general obtained as oils or in the form of low-melting crystalline products.

Compounds of formula (Ia)

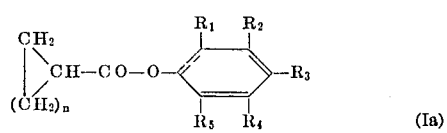

(Ia)

wherein $R_1$ denotes hydrogen, a halogen atom, a $C_1$–$C_8$ alkyl group, a lower alkoxy group, a phenyl group, a formyl group, which may also be acetalized, or a nitro group, $R_2$ represents hydrogen or a halogen atom, a lower alkyl group, an amino group, which may also be substituted by one or two lower alkyl groups, or a trifluoromethyl group, $R_3$ is hydrogen or a halogen atom, a $C_1$–$C_8$ alkyl group, an alkenyl group, an aralkyl group, a phenyl group, an alkoxy group, which may also be in the form of an aralkoxy group, or an alkylthio, trifluoromethyl, nitro or nitrile group, $R_4$ denotes hydrogen, a halogen atom or a lower alkyl group, $R_5$ represents hydrogen, a halogen atom, a $C_1$–$C_{12}$ alkyl group or a nitro group and $n$ denotes 1, 2 or 3 are distinguished by a broad spectrum of biological activity.

One of the types of substances which is important in herbicides, insecticides/ovicides, acaricides and fungicides is that of formula (Ia) wherein $n = 1$, that is to say the cyclopropanecarboxylic acid esters.

Another group which particularly possesses properties which affect plants and members of the order Acarina is described by the general formula (Ib)

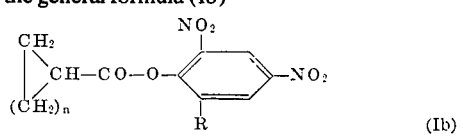

(Ib)

wherein R represents a $C_1$–$C_{12}$ alkyl residue and n represents 1, 2 or 3, that is to say 2,4-dinitrophenolates of cyclopropanecarboxylic, cyclobutanecarboxylic and cyclopentanecarboxylic acids. These compounds possess a rapid weed-killing action on monocotyledon and dicotyledon weeds on pre-emergence application but especially on post-emergence application. As a result of their defoliating and desiccating properties they can be employed for facilitating harvesting. For example, they can be used with excellent results for defoliation in cotton cultures, and in potato cultures a desiccating action is observed which causes an acceleration of ripening in a very favorable manner. These examples can also be generalized to further useful plant cultures, for which the most advantageous conditions have to be determined from case to case. Amongst possible crops to which the compounds can be applied, soya, grain, rice, maize, sugarbeet, cabbage, legumes, alfalfa, lucerne, groundnuts and others should be mentioned in addition to those already mentioned. The compounds of formula (I) or (Ib) are at the same time suitable for protecting decorative plants.

The action on undesired graminea can be increased by surface-active additives which favour a greater effect on the leaves.

The new cycloalkanecarboxylic acid esters of formula (I) are effective against representatives of the class of *Arachnoidea*, above all against pests of the order Acarina, for example against plant-pathogenic and warm-blooded animal-pathogenic species such as *Laelaptidae*, *Haemogamasidae*, *Dermanyssidae*, *Tetranychidae* and others.

Amongst the active substances, those which can be characterized by the formula

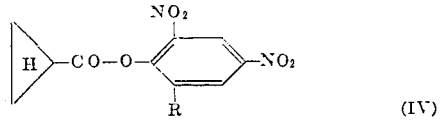

(IV)

wherein R represents a secondary alkyl residue, for example the sec. butyl, sec. amyl or sec. octyl residue are particularly active.

Because of their good solubility in organic solvents the type of formulation of the new esters is pre-indicated. They will predominantly be applied in the form of emulsions which have been manufactured by diluting appropriate concentrates with water. The compounds can also be used in accordance with any other usual formulation appertaining to the state of the art, as is for example described in U.S. Pat. No. 3,329,702 or British Pat. No. 1,047,644 or Swiss Pat. No. 424,359.

In many cases the use of granules is of advantage for the uniform release of active substances over a longer interval of time. These can be manufactured by dissolving the active substance in an organic solvent, absorbing this solution by a granular material, for example attapulgite or $SiO_2$, and removing the solvent.

In the one or other application form, such materials can also be applied by distributing them over large areas (spraying, dusting and the like) by means of aircraft.

The materials according to the invention can, depending on the end use, be employed by themselves or together with conventional pesticides, especially insecticides, fungicides, nematocides, bactericides, herbicides or further acaricides.

When manufacturing herbicidally active agents numerous components can additionally be considered for combination purposes, and amongst these the most important representatives are mentioned below: N-phenyl-N',N'-dimethylurea, N-p-chlorophenyl-N', N'-dimethylurea, N-3,4-dichlorophenyl-N', N'-dimethylurea, N-3,4-dichlorophenyl-N'-methoxy-N'-methyl-urea, N-4-bromo-3-chlorophenyl-N'-methoxy-N'-methylurea, trichloracetic acid, 2,6-dichloro-benzonitrile, 2,3,6-dichlorobenzoic acid, 2,4–D, 2,4,5–T, MCPB, MCPP, isopropylcarbanilate, isopropyl-3-chloro-carbanilate, N-3-chlorophenylcarbamic acid 4'-chlorobutin-2-y1-1-ester, 2,3,6-trichlorophenylacetic acid and salts, 2-chlorodiallylacetamide, 2-chloro-4,6-bis-ethylamino-s-triazine, 2-methoxy-4,6-bis-ethylamino-s-triazine, 2-azido-4-methyl-thio-6-isopropylaminotriazine, disodium monomethylarsenate, various arsenites, Na metaborate, Na chlorate or sulphamic acid.

The various use forms can in the usual manner be provided with additions of substances which improve the distribution, adhesion, rain resistance or penetrating power; fatty acids, resin, glue, casein or alginates may be mentioned as such substances.

The following active substances are possible acaricidally active additives: Karathan = 2-[1-methyl-n-heptyl]-4,6-dinitrophenylcrotonate, Binapacryl = 2-dinitro-phenyl-β, 4,6-dinitro- β-dimethylacrylate, Dimethoate = O,O-dimethyl-S-(N-methyl-carbamoylmethyl)-dithiophosphate, Pyrethrum, Allethrin, Demeton (Systox), Diazinon, O,O-dimethyl-S(p-chlorophenylthio)-methyl-dithiophosphate (methyltrithion), Parathion, Phosphamidon, Phostex, OMPA, Thiometan, N,N-dimethyl-N'-(4-chloro-2-methylphenyl)-formamidine, bis-(p-chlorophenoxy)-methane, 2,3-quinoxaline-dithiol-trithiocarbonate, and Keltane.

EXAMPLE 1

39.7 g of 2,4,6-trichlorophenol and 16 ccs. of pyridine in 500 ccs. of benzene are initially introduced into a 3-necked sulphonation flask. 18.2 ccs. of cyclopropanecarboxylic acid chloride are slowly added dropwise whilst stirring. The mixture is stirred overnight, and is thereafter extracted with 1 N sodium hydroxide solution whilst cooling in ice and then washed with water until neutral. The organic phase is dried over sodium sulphate and then evaporated. After recrystallization from 50 percent strength ethanol 51 g, that is to say 96 percent of theory, of the active substance of formula

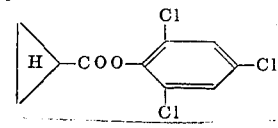

melting at 63°–64° C are obtained. [Active substance No. 3].

The following compounds of formula (Ia): ($n=1$) are obtained in the same manner as described in example 1:

| No. | $R_1$ | $R_2$ | $R_3$ | $R_4$ | $R_5$ | Melting point, °C. | Boiling point °C./mm.Hg |
|---|---|---|---|---|---|---|---|
| 1 | Cl | H | Cl | H | H | | 76/0.035 |
| 2 | H | Cl | Cl | H | H | | 84-86/0.03 |
| 3 | Cl | H | Cl | H | Cl | 63-64 | |
| 4 | H | H | $O_2N-$ | H | H | 95-98 | |
| 5 | $CH_3$ | H | H | H | $CH_3$ | | 80-83/0.05 |
| 6 | H | $CH_3$ | H | H | Cl | | 77-78/0.045 |
| 7 | Cl | H | Cl | Cl | H | | 95-100/0.03 |
| 8 | H | $CH_3$ | Cl | $CH_3$ | H | | 100-102/0.03 |
| 9 | Br | H | H | H | H | | 86-88/0.005 |
| 10 | H | Cl | Cl | Cl | H | 96-100 | |
| 11 | Br | H | Br | H | Br | 83-84 | |
| 12 | H | $CH_3$ | $CH_3$ | H | H | | 95-101/0.04 |
| 13 | $CH_3$ | H | $CH_3$ | H | H | | 80-82/0.01 |
| 14 | H | H | H | H | H | | 76-80/0.038 |
| 15 | H | H | Cl | H | H | | 80-85/0.039 |
| 16 | Cl | H | H | H | H | | 90/0.04 |
| 17 | H | H | Br | H | H | | 86-90/0.04 |
| 18 | Cl | Cl | Cl | Cl | Cl | 106-108 | |
| 19 | $CH_3$ | H | $O_2N-$ | H | $O_2N-$ | 88-90 | |
| 20 | H | H | $CH_3O-$ | H | H | | 102-10/0.06 |
| 21 | Cl | H | H | Cl | H | 44-46 | |
| 22 | Cl | H | H | Cl | H | 82-83 | |
| 23 | sec.-Butyl | H | $O_2N-$ | H | $O_2N-$ | | 135-40/0.02 |
| 24 | Cl | H | H | H | Cl | 34-35 | |
| 25 | —CHO | Cl | H | Cl | H | 62-63 | |
| 26 | $O_2N-$ | H | $O_2N-$ | H | H | 85-86 | |
| 27 | $CH_3$ | H | Cl | H | H | | 95-100/0.04 |
| 28 | $CH_3$ | H | Cl | H | Cl | 47-48 | |
| 29 | Br | H | Cl | H | H | | 90-94/0.02 |
| 30 | Cl | H | Br | H | H | | 85-92/0.035 |
| 31 | Cl | H | Cl | H | Br | 58-60 | |
| 32 | H | $(CH_3)_2N-$ | H | H | H | | 105/0.03 |
| 33 | $CH_3$ | H | H | H | H | | 65/0.07 |
| 34 | H | $CH_3$ | H | $CH_3$ | H | | 75/0.05 |
| 35 | H | H | $C_2H_5$ | H | H | | 62/65/0.07 |
| 36 | H | H | $C_3H_5$ | H | $CH_3$ | | 76/80/0.045 |
| 37 | H | $CH_3$ | Cl | H | H | | 85/90/0.05 |
| 38 | H | $CH_3$ | $CH_3S-$ | H | H | | 125/28/0.07 |
| 39 | H | H | $CH_3S-$ | H | H | | 95/0.038 |
| 40 | H | H | $CF_3$ | H | H | | 105/10/12 |
| 41 | $O_2N-$ | H | $CF_3$ | H | H | 110-112 | |
| 42 | Cl | H | Cl | Cl | $NO_2$ | 58-60 | |
| 43 | $O_2N-$ | H | $CH_3$ | H | H | | 118-124/0.025 |
| 44 | H | $CH_3$ | H | H | $NO_2$ | | 110/0.05 |
| 45 | Isopropyl | H | H | $CH_3$ | H | | 85-88/0.04 |
| 46 | $O_2N-$ | $CH_3$ | Cl | H | $NO_2$ | 138-140 | |
| 47 | H | $CH_3$ | $NO_2$ | H | H | 38-42 | |
| 48 | H | H | $C_6H_5$ | H | H | 100-102 | |
| 49 | $O_2N-$ | H | $NO_2$ | H | $NO_2$ | 154-157 | |
| 50 | $CH_3$ | H | H | (a) | H | 145-150/15 | |
| 51 | $O_2N-$ | H | $NO_2$ | H | (b) | 168-170/0.05 | |
| 52 | Isopropyl | H | H | H | H | | 84-88/0.03 |
| 53 | tert.Butyl | H | H | H | H | | 80/0.035 |
| 54 | Isopropyl | H | $NO_2$ | H | $NO_2$ | 80-81 | |
| 55 | tert.Butyl | H | $NO_2$ | H | $NO_2$ | 113-115 | |
| 56 | I | H | NC— | H | I | 155-156 | |
| 57 | 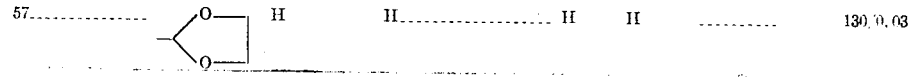 | H | H | H | H | | 130/0.03 |

| No. | R₁ | R₂ | R₃ | R₄ | R₅ | Melting point, °C. | Boiling point °C./mm.Hg |
|---|---|---|---|---|---|---|---|
| 58 | H | H | C₆H₅—CH₂—O— | H | H | 100–102 | |
| 59 | Cl | H | C₆H₅ | H | H | 46–47 | |
| 60 | C₆H₅ | H | H | H | H | | 110/0.001 |
| 61 | sec.Octyl | H | NO₂ | H | NO₂ | | 178/0.03 |
| 62 | NO₂ | H | sec.Octyl | H | NO₂ | | 179/0.06 |
| 63 | CH₃O— | H | Allyl | H | H | | 105/0.001 |
| 64 | H | H | C₆H₅—C(CH₃)₂— | H | H | | 140/0.01 |
| 65 | H | H | tert.Butyl | H | H | | 90/0.015 |
| 66 | Cl | H | NO₂ | H | NO₂ | 85–86 | |

ᵃ Isopropyl.
ᵇ Isoamyl.

In the same manner, the following compounds of the type

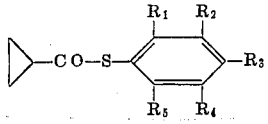

are manufactured with appropriate thiophenols:

| No. | R₁ | R₂ | R₃ | R₄ | R₅ | Melting point, °C. | Boiling point, °C./mm. Hg |
|---|---|---|---|---|---|---|---|
| 67 | H | H | tert.Butyl | H | H | | 115/0.07 |
| 68 | H | H | Cl | H | H | | 90/0.06 |
| 69 | H | H | H | H | H | | 82/0.06 |
| 70 | H | H | CH₃ | H | H | | 89–91/0.06 |
| 71 | CH₃ | H | H | H | H | | 80/0.035 |
| 72 | H | H | Br | H | H | | 106–110/0.02 |
| 73 | Isopropyl | H | H | H | H | | 87/0.001 |
| 74 | H | H | NO₂ | H | H | 63–66 | |

The following compounds are obtained in an analogous manner to the manufacturing example:
No. 75 Cyclobutanecarboxylic acid 2,4-dinitro-6-sec.butyl phenyl ester, melting point 47°–48° C;
No. 76 Cyclobutanecarboxylic acid 2,4-dinitro-6-isoamylphenyl ester, boiling point 150° C/0.05 mm Hg;
No. 77 Cyclobutanecarboxylic acid 2,4-dinitro-6-chlorophenyl ester, melting point 76°–78° C;
No. 78 Cyclobutanecarboxylic acid 2,4-dinitro-6-methylphenyl ester, boiling point 96°–98° C/0.002 mm Hg;
No. 79 Cyclobutanecarboxylic acid 2,4-dinitro-6-isopropylphenyl ester, boiling point 104°–108° C/0.01 mm Hg;
No. 80 Cyclobutanecarboxylic acid 2,4-dinitro-6-sec.octylphenyl ester, boiling point 146° C/0.015 mm Hg;
No. 81 Cyclopentanecarboxylic acid 2,4-dinitro-6-sec.butylphenyl ester, boiling point 160° C/0.015 mm Hg;
No. 82 Cyclopentanecarboxylic acid 2,4-dinitro-6-isoamylphenyl ester, boiling point 118° C/0.005 mm Hg;
No. 83 Cyclopentanecarboxylic acid 2,4-dinitro-6-chlorophenyl ester, melting point 61°–63° C.
No. 84 Cyclopentanecarboxylic acid 2,4-dinitro-6-methylphenyl ester, boiling point 111°–112° C/0.002 mm Hg;
No. 85 Cyclopentanecarboxylic acid 2,4-dinitro-6-isopropylphenyl ester, boiling point 106°–**° C/0.015 mm Hg;
No. 86 Cyclopentanecarboxylic acid 2,4-dinitro-6-sec.octylphenyl ester, boiling point 138° C/0.002 mm Hg.

EXAMPLES OF FORMULATIONS

Dusting Agents
Equal parts of an active substance according to the invention and of precipitated silica are finely ground. Dusting agents preferably containing 1–6 percent of active substance can be manufactured therefrom by mixing with kaolin or talc.

Spraying Powders
In order to manufacture spraying powder the following components are for example mixed and finely ground: 50 parts of active substance according to the present invention, 20 parts of Hisil (highly adsorbent silica), 25 parts of bolus alba (kaolin), 3.5 parts of a reaction product of p-tert. octylphenol and ethylene oxide and 1.5 parts of sodium 1-benzyl-2-stearyl-benzimidazole-6,3'-disulphonate.

Emulsion Concentrate
Easily soluble active substances can also be formulated as an emulsion concentrate in accordance with the following instruction: 20 parts of active substance, 70 parts of xylene and 10 parts of a mixture of a reaction product of an alkylphenol with ethylene oxide and calcium dodecylbenzene-sulphonate are mixed. On dilution with water to the desired concentration a sprayable emulsion is produced.

EXAMPLE 2
Action against Spider Mites

Bush bean plants (Phaseolus vulgaris) in the two-leaf stage are infected, 12 hours before treatment with the active substance, with spider mites by placing attacked pieces of leaf from a culture on them so that after the end of this time a population in all stages of development is present on the plant. The plants are then sprayed with emulsified active substance using a chromatography atomizer, until a uniform deposit of droplets forms on the leaf surface. The results are assessed after 2 and 7 days: the parts of the plants are inspected under a stereomicroscope in order to calculate the percentage mortality. The action on eggs can, with this experimental arrangement, not yet be ascertained after 2 days because the average hatching time is, at this point in time, not yet accurately known.

The table which follows gives the mortality percentages of the normally sensitive type Tetranychus urticae Koch and the percentage mortalities of the phosphoric acid ester-tolerant type Tetranychus telarius l.

Compound No. 19
a. Action against *Tetranychus urticae*

| Concentration [ppm] | Mortality in percent | | | | |
|---|---|---|---|---|---|
| | after 2 days | | after 7 days | | |
| | larvae | adults | eggs | larvae | adults |
| 800 | 100 | 100 | 100 | 100 | 100 |
| 400 | 80 | 80 | 80 | 80 | 80 |
| 200 | 60 | 60 | 80 | 80 | 80 |
| 100 | 60 | 60 | 60 | 60 | 80 | b. Action against *Tetranychus telarius*

| Concentration [ppm] | Mortality in percent | | | | |
|---|---|---|---|---|---|
| | after 2 days | | after 7 days | | |
| | larvae | adults | eggs | larvae | adults |
| 800 | 100 | 80 | 100 | 100 | 100 |
| 400 | 80 | 80 | 100 | 100 | 80 |
| 200 | 60 | 60 | 80 | 80 | 80 |
| 100 | 60 | 60 | 60 | 60 | 60 |

Compound No. 23
a. Action against *Tetranychus urticae*

| Concentration [ppm] | Mortality in percent | | | | |
|---|---|---|---|---|---|
| | after 2 days | | after 7 days | | |
| | larvae | adults | eggs | larvae | adults |
| 800 | 100 | 100 | 100 | 100 | 100 |
| 400 | 100 | 100 | 100 | 100 | 100 |
| 200 | 100 | 100 | 100 | 100 | 100 |
| 100 | 100 | 100 | 100 | 100 | 100 | b. Action against *Tetranychus telarius*

| Concentration [ppm] | Mortality in percent | | | | |
|---|---|---|---|---|---|
| | after 2 days | | | after 7 days | |
| | larvae | adults | eggs | larvae | adults |
| 800 | 100 | 100 | 100 | 100 | 100 |
| 400 | 100 | 100 | 100 | 100 | 100 |
| 200 | 100 | 100 | 100 | 100 | 100 |
| 100 | 100 | 100 | 80 | 80 | 100 |

Compound No. 26
a. Action against *Tetranychus urticae*

| Concentration [ppm] | Mortality in percent | | | | |
|---|---|---|---|---|---|
| | after 2 days | | | after 7 days | |
| | larvae | adults | eggs | larvae | adults |
| 800 | 100 | 100 | 100 | 100 | 100 |
| 400 | 100 | 100 | 80 | 100 | 80 |
| 200 | 100 | 80 | 80 | 80 | 80 |
| 100 | 80 | 80 | 60 | 80 | 80 | b. Action against *Tetranychus telarius*

| Concentration [ppm] | Mortality in percent | | | | |
|---|---|---|---|---|---|
| | after 2 days | | | after 7 days | |
| | larvae | adults | eggs | larvae | adults |
| 800 | 100 | 100 | 100 | 100 | 100 |
| 400 | 100 | 100 | 80 | 100 | 80 |
| 200 | 80 | 80 | 60 | 80 | 80 |
| 100 | 60 | 0 | 0 | 0 | 0 |

Compound No. 51
a. Action against *Tetranychus urticae*

| Concentration [ppm] | Mortality in percent | | | | |
|---|---|---|---|---|---|
| | after 2 days | | | after 7 days | |
| | larvae | adults | eggs | larvae | adults |
| 800 | 100 | 100 | 100 | 100 | 100 |
| 400 | 100 | 100 | 100 | 100 | 100 |
| 200 | 80 | 100 | 100 | 100 | 100 |
| 100 | 80 | 100 | 100 | 100 | 100 | b. Action against *Tetranychus telarius*

| Concentration [ppm] | Mortality in percent | | | | |
|---|---|---|---|---|---|
| | after 2 days | | | after 7 days | |
| | larvae | adults | eggs | larvae | adults |
| 800 | 100 | 100 | 100 | 100 | 100 |
| 400 | 100 | 100 | 100 | 100 | 100 |
| 200 | 80 | 100 | 80 | 80 | 100 |
| 100 | 80 | 100 | 80 | 80 | 80 |

Compound No. 61
a. Action against *Tetranychus urticae*

| Concentration [ppm] | Mortality in percent | | | | |
|---|---|---|---|---|---|
| | after 2 days | | | after 7 days | |
| | larvae | adults | eggs | larvae | adults |
| 800 | 100 | 100 | 100 | 100 | 100 |
| 400 | 80 | 100 | 60 | 100 | 100 |
| 200 | 80 | 80 | 60 | 80 | 100 |
| 100 | 80 | 80 | 0 | 60 | 100 | b. Action against *Tetranychus telarius*

| Concentration [ppm] | Mortality in percent | | | | |
|---|---|---|---|---|---|
| | after 2 days | | | after 7 days | |
| | larvae | adults | eggs | larvae | adults |
| 800 | 100 | 100 | 100 | 100 | 100 |
| 400 | 80 | 100 | 100 | 100 | 100 |
| 200 | 80 | 80 | 80 | 100 | 100 |
| 100 | 60 | 0 | 0 | 0 | 60 |

EXAMPLE 3
Open Terrain Experiments Against Spider Mites (*Panonychus ulmi*)

1. In St. Triphon, Canton Wallis, Switzerland, four apple bushes of the "Bernese Rose" variety were sprayed on July 18, 1968 with an aqueous broth manufactured from an emulsion concentrate and containing 0.05 percent of the active substance No. 23.

Binapacryl (=[2,4-dinitro-6-sec.butylphenyl]-2-methyl-crotonate), used in the same amount, served as the comparison preparation.

The initial population (eggs and mites) which represents an average value of the attack of 4 × 20 leaves of the apple bushes, is treated as 100 percent. Evaluation gave the following result:

| Preparation | % of Active Substance. | Number of Pests on 18.7. | Percentage of Initial Population on | | |
|---|---|---|---|---|---|
| | | | 29.7. | 12.8. | 26.8. |
| No. 23 | 0.05 | 130 | 17% | 18% | 15% |
| Binapacryl | 0.05 | 115 | 45% | 18% | 21% |
| Untreated | — | 85 | 96% | 106% | 124% |

2. In Les Barges, Canton Wallis, Switzerland, four apple bushes at a time, of the "Golden Permaine" variety were treated on July 9, 1968 as described under 1).

Evaluation gave the following result:

| Preparation | % of Active substance. | Number of Pests on 8.7. | Percentage of Initial Population on | | | |
|---|---|---|---|---|---|---|
| | | | 22.7. | 7.8. | 19.8. | 2.9. |
| No. 23 | 0.05 | 90 | 25% | 80% | 74% | 108% |
| Binapacryl | 0.05 | 80 | 42% | 163% | 150% | — |
| Untreated | — | 77 | 186% | 410% | 530% | 670% |

3. In Montesanto, Ferrara, Italy, four apple bushes at a time of the "Morning Scent" variety were sprayed on July 12, 1968 according to the method given under 1). In this case the experiment only related to the number of mites and left the eggs present out of account. The comparison preparation was used in a stronger concentration.

Evaluation gave the following result:

| Preparation | % of Active Substance | Number of Pests on 12.7. | Percentage of Initial Population on | | | |
|---|---|---|---|---|---|---|
| | | | 17.7. | 22.7. | 27.7. | 1.8. |
| No. 23 | 0.05 | 381 | 1% | 7.4% | 13% | 11% |
| Binapacryl | 0.08 | 285 | 1.8% | 12% | 13% | 11% |
| Untreated | — | 400 | 122% | 110% | 142% | 106% |

EXAMPLE 4
Action against ticks
A. *Rhipicephalus bursa*

5 adult hungry ticks are counted out into a test tube and dipped for 1–2 minutes in 2 ml of an aqueous emulsion containing 100 ppm of test substance. The test tube is then closed with a standard cottonwool swab and inverted so that the active substance emulsion is taken up by the cottonwool. Evaluation took place after 2 weeks.

For each experiment, two repeats are run. Compound No. 53 resulted in 100 percent mortality after 2 weeks. Compound No. 54 resulted in 100 percent mortality after 2 weeks.

B. Boophilus microplus

The same experiment was repeated with 10–20 larvae, using a special dilution series of 100, 50, 10 and 1 ppm.

Compound No. 53 resulted in 100 percent mortality after 3 days, with 50 ppm. Compound No. 54 resulted in 100 percent mortality after 3 days with 10 ppm.

EXAMPLE 5
Action against *Ephestia kühniella*

20 eggs of the meal moth are wetted on a folded filter paper with an emulsion of the active substance to be tested. After drying the eggs are placed in Petri dishes and these dishes are covered with a fine-mesh wire net to permit unimpeded access of air.

A dilution series with 1,000, 500, 250, 125 and 62.5 ppm is employed. The action is ascertained under a binocular microscope as soon as the untreated control has hatched.

The compounds Nos. 33, 40, 52, 53 and 57 resulted in 100 percent mortality at a minimum concentration of 125 ppm.

The remaining compounds, Nos. 1 to 64, No. 67 to 74 and No. 77, 78, 83 and 84 resulted in 100 percent mortality at a minimum concentration of 62.5 ppm.

EXAMPLE 6
Action against attack by fungi.

A) *Erysiphe cichoriacearum* (cucumber mildew)

Courgette plants (*Cucurbita Pepo L.*) were grown in a greenhouse and sprayed once prophylactically with an aqueous broth containing increasing quantities of the active substance to be tested. Two days after the treatment the plants treated in this way were infected with spores of *Erysiphe cichoriacearum* DC. and after 12–14 days they were rated for attack by fungi.

Untreated plants which after the end of the incubation period showed 100 percent attack served as controls.

The evaluation indicated the following minimal inhibitory concentrations:

| Compound No. | Concentration [ppm] |
|---|---|
| 19 | 300 |
| 42 | 300 |
| 46 | 300 |
| 51 | 100 |
| 54 | 300 |
| 62 | 30 |

B. *Rhizoctonia solani* (flopping disease)

A mixture of equal parts of quartz sand and alumina is inoculated with an aqueous mycelium suspension of *Rhizoctonia solani* Kühn, filled into pots and set up in a greenhouse. After 2 days cotton is sown in the pots and thereafter an aqueous broth containing increasing quantities of the active substance to be tested is uniformly poured over the pots.

The pots are kept suitably moist. After 14 days the percentage of cotton plants which have grown healthily is determined.

The minimum inhibitory concentration was 300 ppm for Compound No. 40.

EXAMPLE 7
Action against weeds

A. In order of determine the post-emergence action in soya, grain and cotton, the plants listed in the table were sown and were each treated, after emergence, with 2 kg/ha and 1 kg/ha of a substance according to the invention. The following results were achieved on assessment after 12 to 14 days:

| Plants | Compound No. 51 | | Compound No. 54 | |
|---|---|---|---|---|
| | 2 kg/ha | 1 kg/ha | 2 kg/ha | 1 kg/ha |
| Calendula | 9 | 9 | 9 | 9 |
| Chrysanthemum | 9 | 9 | 9 | 9 |
| Brassica | 9 | 9 | 9 | 9 |
| Amaranthus | 9 | 1 | 9 | 1 |
| Ipomoea | 9 | 9 | 9 | 3 |
| Soja | 3 | 3 | 2 | 2 |
| Triticum | 1 | 1 | 1 | 1 |
| Hordeum | 1 | 1 | 1 | 1 |
| Gossypium | 2 | 2 | 3 | 2 |

Legend: 1 = no action
9 = total destruction of the plant

The table shows the good selectivity of the compounds in soya, grain and cotton. A transient weak effect on soya and cotton is without significance.

B. A series of compounds according to the invention shows a particularly rapid action both against broad-leaved weeds and against grass-like weeds. In order to determine the post-emergence action the weeds listed in the table were sown and each treated with 4 kg/ha and 2 kg/ha of a substance according to the invention. After 24 hours the weeds were already no longer viable.

| Compound No. | Plants | Sinapis | Lepidium | Avena | Setaria |
|---|---|---|---|---|---|
| 75 | 4 kg/ha | 9 | 9 | 8 | 8 |
| | 2 kg/ha | 9 | 9 | 7 | 8 |
| 76 | 4 kg/ha | 9 | 9 | 9 | 8 |
| | 2 kg/ha | 9 | 9 | 8 | 8 |
| 79 | 4 kg/ha | 9 | 8 | 9 | 8 |
| | 2 kg/ha | 8 | 8 | 7 | 7 |
| 80 | 4 kg/ha | 9 | 9 | 9 | 9 |
| | 2 kg/ha | 9 | 9 | 8 | 9 |
| 81 | 4 kg/ha | 9 | 9 | 8 | 7 |
| | 2 kg/ha | 9 | 9 | | 7 |
| 82 | 4 kg/ha | 9 | 9 | 8 | 8 |
| | 2 kg/ha | 9 | 9 | 7 | 7 |
| 85 | 4 kg/ha | 9 | 9 | 8 | 7 |
| | 2 kg/ha | 8 | 8 | 7 | 7 |

Legend: 7 – 8 = plant no longer viable  9 = plant dead.

I claim:

1. Compounds of the formula

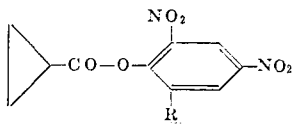

wherein R represents a $C_1$–$C_{12}$ alkyl residue.

2. The compound cyclopropanecarboxylic acid 2,4-dinitro-6-isopropyl phenyl ester as claimed in claim 7.

3. The compound cyclopropanecarboxylic acid 2,4-dinitro-6-methyl-phenyl ester as claimed in claim 1.

4. Compounds as claimed in claim 1 wherein R represents a secondary $C_{4-12}$ alkyl residue.

5. The compound cyclopropanecarboxylic acid 2,4-dinitro-6-sec.butyl phenyl ester as claimed in claim 4.

6. The compound cyclopropanecarboxylic acid 2,4-dinitro-6-isoamyl phenyl ester as claimed in claim 4.

7. The compound cyclopropanecarboxylic acid 2,4-dinitro phenyl ester.

* * * * *